Figure 1:
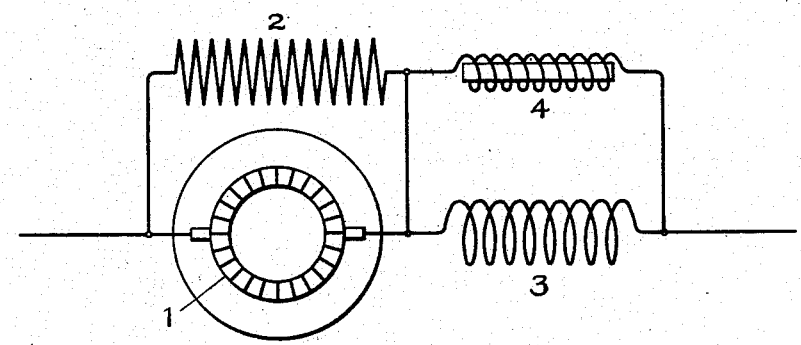

No. 677,355.  
H. M. HOBART.  
REGULATION OF DYNAMO ELECTRIC MACHINES.  
(Application filed Jan. 5, 1901.)  
Patented July 2, 1901.

(No Model.)

Witnesses:

Inventor:
Henry M. Hobart,
by Albert G. Davis
Atty.

UNITED STATES PATENT OFFICE.

HENRY M. HOBART, OF BERLIN, GERMANY, ASSIGNOR TO GENERAL ELECTRIC COMPANY, OF NEW YORK.

REGULATION OF DYNAMO-ELECTRIC MACHINES.

SPECIFICATION forming part of Letters Patent No. 677,355, dated July 2, 1901.

Application filed January 5, 1901. Serial No. 42,259. (No model.)

*To all whom it may concern:*

Be it known that I, HENRY M. HOBART, a citizen of the United States, residing at Berlin, Germany, have invented certain new and useful Improvements in Regulation of Dynamo-Electric Machines, (Case No. 1,840,) of which the following is a specification.

Compound-wound dynamo-electric machines are usually provided with German-silver shunts connected across the series windings for the purpose of adjusting the compounding effect of these windings to the exact amount desired. I have observed that in practice when a large load is suddenly thrown upon such a machine the voltage is momentarily pulled down and after a short interval then returns to its proper value. This drop in voltage is, however, more than can be ascribed to any observable decrease in speed and takes place even though the machine be overcompounded. This phenomenon I have found to be due to the differences in the time constants of the series windings and the resistances shunted about the same.

To illustrate, suppose, for example, a heavy load is suddenly thrown upon a machine of the character described. The current in the non-inductive German-silver shunt, meeting no obstacle in the way of reactance, rises practically instantaneously to its full value. The current in the series winding, however, rises but slowly, due to the high inductance of this winding which encircles the massive steel or iron field-magnets of the machine. Before the current in the series winding has a chance to rise to its full value the terminal voltage is cut down by reason of the armature reaction of the machine, together with other causes well understood. After a brief interval the current in the series winding reaches its proper value, thus counterbalancing the effect of armature reaction and bringing the voltage of the machine back to its proper value.

I have found that the objectionable variations in voltage of the character described may be remedied by bringing the time constant of the shunt about the series coil more nearly into equality with that of the series coil itself, thereby causing the current in the series coil to rise in reasonably exact proportion to the load instead of lagging behind the same by an appreciable time interval, as has heretofore been the case. This result may of course be accomplished in a variety of ways, the principle of the invention having once been explained. The particular means of which I make use, however, consists in rendering the shunt-circuit about the series coil or coils of sufficient reactance to make its time constant of an appreciable value, which may be either equal to or greater than that of the series winding or windings. If made greater than that of the series winding, the current in the latter will rise faster than in proportion to the load, thus anticipating the drop in voltage in the lines fed by the machine.

It is obvious that various proportions and adjustments of the character mentioned may be made without departing from my invention, for a better understanding of which reference is to be had to the following description, taken in connection with the accompanying drawings. As for its various features of novelty, they will be pointed out in the claims appended hereto.

Figure 2:
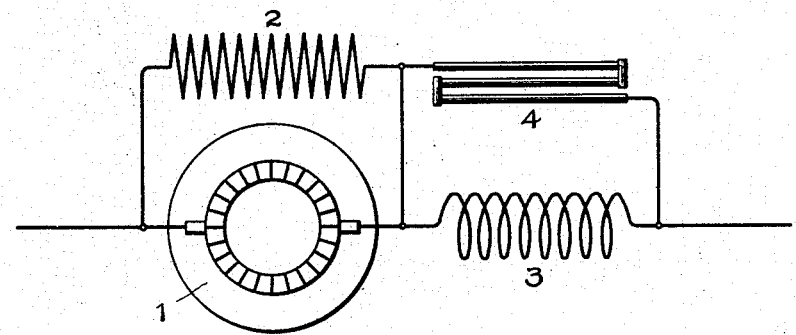

Figure 1 represents in diagram one embodiment of my invention, and Fig. 2 a modification thereof.

In Fig. 1 the armature of a dynamo-electric machine—such, for example, as a railway-generator—is represented at 1, the shunt-winding being indicated at 2 and the series winding at 3. For the purpose of adjusting the magnetizing effect of this series winding I connect across the terminals of the same a shunt-circuit 4, preferably of German silver. In order to prevent the prompt rise and fall of current in this shunt-circuit in response to corresponding variation of load on the machine, I may wind the German-silver conductor, constituting the shunt-circuit, about a core of magnetic material, preferably laminated. The effect of the inductance thus introduced is to prevent the currents in the German-silver shunt from rising any faster in value than does the current in the series winding across which the shunt is connected. The magnetizing effect of the series winding thus follows more closely the variations of load, by virtue of which fact the sudden fluctuations in voltage above referred to are effectually prevented.

Instead of using a magnetic core to obtain a sufficient inductance in the adjusting-shunt of the series winding I may instead form this shunt out of iron bars of considerable cross-section and suitable length, thereby taking advantage of the so-called "skin effect," which arises upon any sudden change in current through conductors of this character. Fig. 2 illustrates this construction, this figure being the same as Fig. 1, except for the difference in the shunts about the series coil 3. This shunt is shown as consisting of a series of iron bars connected together and with the terminals of the same joined across the said series winding. It is obvious, of course, that the various factors, such as resistance and inductance, going to make up the shunt-circuits about the series coils 3 in Figs. 1 and 2 may be made adjustable, so that they may be changed from time to time, or, if desired, the parts may be proportioned once for all, so that no further adjustment will be required. These are details, however, which will be obvious to one skilled in the art.

What I claim as new, and desire to secure by Letters Patent of the United States, is—

1. The combination of a dynamo-electric machine provided with a winding, and a reactive adjusting-shunt for said winding.

2. A compound-wound dynamo-electric machine having an inductive shunt about its series winding.

3. The combination of a dynamo-electric machine provided with a winding, an adjusting-shunt therefor, and means for causing the time constant of the shunt to approximate that of the winding.

4. A dynamo-electric machine having a series winding, and a circuit possessing inductance shunted across points in said winding.

5. The combination of a dynamo-electric machine provided with a series winding, and an adjusting-shunt for said winding formed in part at least of a bar or bars of magnetic material.

6. A dynamo-electric machine, a regulating-coil therefor, and a reactive adjusting-shunt for said coil.

In witness whereof I have hereunto set my hand this 18th day of December, 1900.

HENRY M. HOBART.

Witnesses:
HENRY HASPER,
WOLDEMAR HAUPT.